United States Patent

Rajakovics

[15] 3,705,734
[45] Dec. 12, 1972

[54] ARRANGEMENT FOR COMPENSATING FOR CHANGES IN THE LENGTH OF PIPES AND THE LIKE

[72] Inventor: Gundolf E. Rajakovics, Wien, Austria

[73] Assignee: Gebr. Boehler & Co., A.G., Kapfenberg, Austria

[22] Filed: May 13, 1970

[21] Appl. No.: 36,763

[30] Foreign Application Priority Data

May 16, 1969    Austria..................A 4659/69

[52] U.S. Cl. ....................285/41, 285/47, 285/226
[51] Int. Cl................................................F16l 53/00
[58] Field of Search....................285/41, 47, 300, 226

[56] References Cited

UNITED STATES PATENTS

| 2,172,612 | 9/1939 | Hassenkamm | 285/300 |
| 2,663,580 | 12/1953 | Shirk | 285/41 |
| 3,127,200 | 3/1964 | Sayag | 285/41 X |
| 3,469,862 | 9/1969 | Conibeer | 285/41 |

FOREIGN PATENTS OR APPLICATIONS

| 884,804 | 5/1943 | France | 285/300 |
| 675,935 | 7/1952 | Great Britain | 285/47 |

Primary Examiner—Andrew V. Kundrat
Attorney—Arthur O. Klein

[57] ABSTRACT

Arrangement for compensating for changes in the lengths of pipes subjected to high operative temperatures. One of the two pipe portions at a joint between them extends into the other, and a flexible pleated sleeve surrounds the inner pipe portion, the space between the pleated sleeve and the inner pipe being dead ended at a location remote from the zone at which the two main portions of the pipes confront each other. The arrangement includes means for cooling the space within the pleated sleeve, and means selectively to heat such space and its contents, as at the start of an operation, to melt any solid material which may be in the space within the pleated sleeve.

6 Claims, 1 Drawing Figure

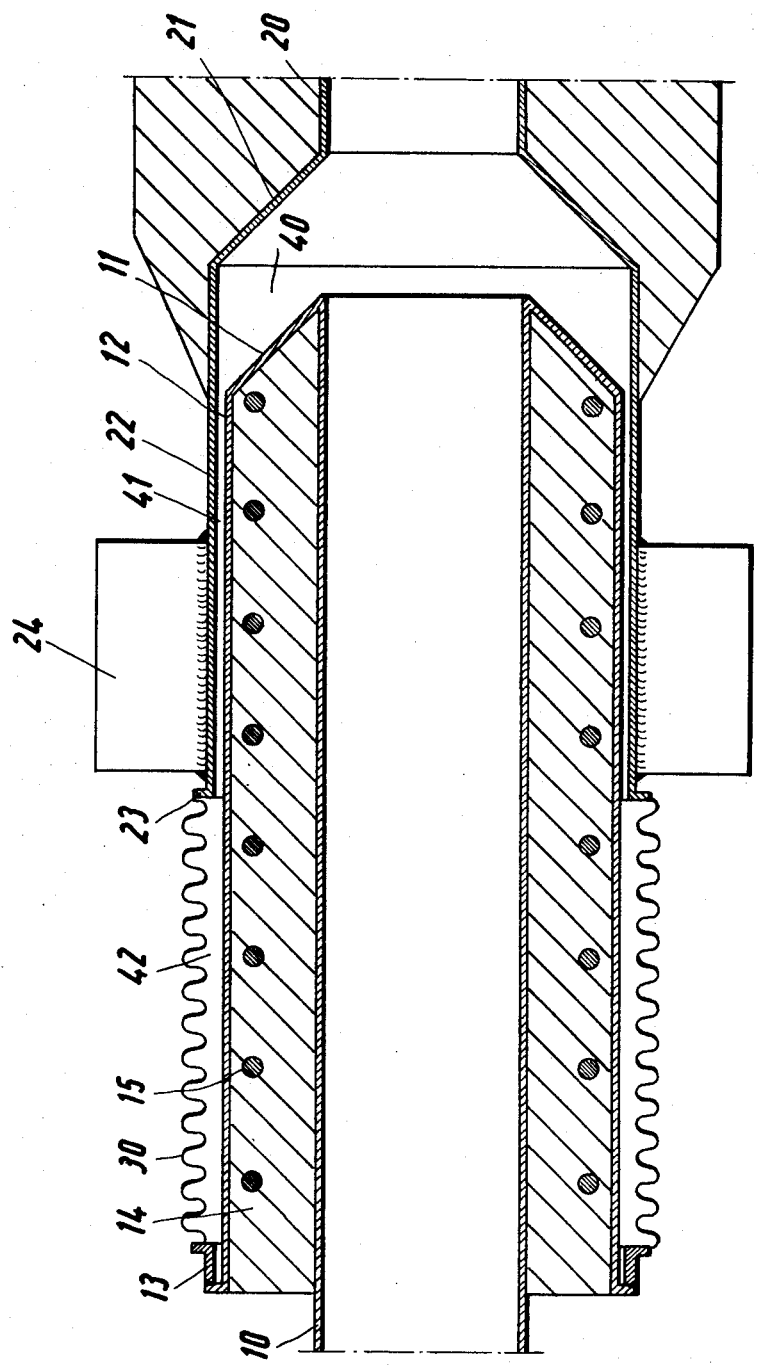

ARRANGEMENT FOR COMPENSATING FOR CHANGES IN THE LENGTH OF PIPES AND THE LIKE

The invention relates to an arrangement for compensating for changes in the length of pipes which are subjected to high temperatures, in particular, pipes which conduct liquid metals as, for example, liquid sodium. Such pipes may be used in conjunction with nuclear reactors. Such pipes include a joint which has a resilient foldable wall means which connects two separate pipe portions. One of the pipe portions extends into the other and the resilient wall means surround the inner pipe portion. The space defined between the inner and outer pipe portions includes a heat insulating layer.

Pipe for use in nuclear reactors where cooled liquid sodium is conducted must generally include expansion elements in order to avoid inordinately large heat stresses in the pipes. It has therefore been quite usual to employ resilient wall means such as, for example, a "Sylphon" type of wall means as expansionable elements in this type of construction. However, with the very high temperatures involved in nuclear reactors, the strength of the usual materials used deteriorates to such an extent that the useful life of the expandable elements becomes very small. Furthermore, the corrosion of the materials, in particular when temperatures above 600°C are present, increases to such an extent that, in view of the very thin wall thicknesses of these types of metallic expansible means, their imperviousness becomes deficient at a very early stage. Metal alloys, which have higher strength properties at high temperatures, very frequently include high contents of alloying elements such as, for example, nickel, which are dissolved by the sodium at temperatures above 600°C at a very rapid pace. Due to the aforedescribed circumstances, it is also possible that these expansible elements when made out of alloyed metals are damaged after a short useful life.

It is a general object of this invention to eliminate the aforedescribed disadvantages and to provide an expansible connecting means for compensating for changes in the length of pipes so that the effective length of the pipe remains substantially constant at elevated operating temperatures of the medium to be conducted through the pipes. One such elevated temperature is, for example, 399°C. In accordance with the invention, this is attained with an arrangement of the aforedescribed type which provides means for cooling the lengthwise narrow slit. Such cooling means take the form of cooling ribs mounted on the exterior pipe portion.

In a preferred embodiment of the invention, there is shown an arrangement wherein the space between the exterior expansible wall means and the inner pipe portion and also preferably the slit is heated, for example, with the aid of an electrical heating means mounted in the interior side of the inner pipe portion.

Further details of the arrangement of the invention will be described in conjunction with the accompanying drawing in which the single FIGURE is a view in axial diametral cross-section through one embodiment of pipe joint of the invention.

The joint arrangement shown includes two aligned pipes 10 and 20 through which liquid sodium is adapted to flow. In their main portions the pipes 10 and 20 are of substantially the same diameter. At the pipe joint, the pipe portion 10 is surrounded by a coaxially arranged sleeve or pipe portion 12 which is connected with the pipe 10 by a frusto-conical member 11 which is coaxial of pipe 10 and converges toward the main part of pipe 20. At the joint pipe 20 has an exterior sleeve or pipe portion 22 connected to the pipe 20 by means of a frusto-conical member 21 coaxial of and spaced from member 11. A space 40 exists between the frusto-conical members 11 and 21. This space 40 is joined by a small narrow annular slit 41 defined between the sleeves 12 and 22. At the end of the sleeves 12 and 22 which are distant from the frusto-conical members 11 and 21, there are provided radially outwardly extending annular flanges 13 and 23, respectively, to which there are connected the respective ends of an annularly pleated flexible sleeve 30 of the "Sylphon" type in an impervious manner.

There is disposed between the inner sleeve 12 and the pipe 10 a layer of insulating material 14, such as, for example, asbestos. Furthermore, there are provided on the exterior sleeve 22 in a longitudinal direction immediately above the narrow slit 41 a plurality of substantially identical substantially equally angularly spaced radial cooling ribs 24, for example, 48 in number. The spaces existing between the pleated sleeve 30 and the inner sleeve 12, namely, the space 42, as well as the space between the inner sleeve 12 and the outer sleeve 22, namely, the annular slit 41, are heated with the aid of an electrical resistance 15 mounted on the interior side of the inner pipe section 12. The resistance may, for example, be spirally wound and have its opposite end selectively connected to a suitable heating current source. As a consequence of such heating, it is possible at any time prior to the operation of the system of which the pipes 10, 20 are parts, to convert any solid sodium that may be present between the folds of the flexible sleeve 30 by heating it into a liquid state and thereby ensure that the sleeve 30 is not damaged due to the usual presence in the aforementioned locations of solid sodium. The pipes 10 and 20, as well as the other portions which are contacted by the sodium including the flexible sleeve 30, consist of corrosion resistant material such as rust-proof chromium-nickel steel.

Even when the temperatures of the liquid sodium flowing through the pipes 10 and 20 is very high, the temperatures of the sodium which contacts the flexible sleeve 30 is relatively low due to the aforedescribed arrangement and its cooling effect. Thus the end of the space 42 remote from the space 40 is closed; space 42 is filled with liquid sodium, for example, which remains stagnant and is readily cooled by fins 24 and remains relatively cool in operation. Because of the aforedescribed features, the arrangement of the invention and its flexible sleeve are not subject to any consequential corrosion and thereby have an extremely long useful life.

Although the invention is illustrated and described with reference to one preferred embodiment thereof, it is to be expressly understood that it is in no way limited to the disclosure of such a preferred embodiment, but is capable of numerous modifications within the scope of the appended claims.

What is claimed is:

1. A joint adapted for use between two aligned pipes subjected to high temperatures in operation, the joint permitting lengthwise movement of the pipes relative to each other, said joint comprising at least substantially coaxial end portions of the two pipes, a part of the end portion of a first pipe being telescoped over the end portion of the second pipe to form an annular space of substantial axial length between said end portions of the pipes, said annular space communicating with the space within the pipes, and a flexible annularly pleated sleeve of substantial axial length telescoped over the end portion of the second pipe, one end of the pleated sleeve being connected and sealed to the first pipe adjacent the end thereof at the joint, and the other end of the pleated sleeve being connected and sealed to the second pipe, means to cool the annular space between said telescoped end portions of the pipes, and thus the material within such space, said cooling means comprising cooling fins attached to and projecting radially outwardly in axial planes from the end portion of the first end pipe surrounding said annular space, and means for selectively heating the annular space between said end portions of the pipes and to heat the spaces between the walls of the flexible pleated sleeve and the end portion of the second pipe, thereby melting solid material in said spaces before operation of the apparatus of which the pipes and pipe joint are parts.

2. A joint according to claim 1, wherein the main portions of the two pipes are of generally the same diameter, the end portions of the two pipes are substantially coaxial, and the end portion of the first pipe includes a generally radially outwardly directed annular flange connected to the end of the main portion of the first pipe, and a cylindrical sleeve forming an extension of the first pipe sealingly connected to the outer edge of said annular flange, the said cylindrical sleeve being telescoped over the end portion of the second pipe and radially spaced therefrom.

3. A joint according to claim 2, wherein the end portion of the second pipe includes a generally radially outwardly directed second annular flange connected to the end of the main portion of the second pipe, and a second cylindrical sleeve telescoped over the end of the main portion of the second pipe and sealingly connected to the outer edge of the second annular flange, the said second cylindrical sleeve being telescoped within the first cylindrical sleeve and forming therewith said annular axially elongated space communicating with the interiors of the pipes.

4. A joint according to claim 3, wherein the first and second flanges are parallel and spaced axially from each other.

5. A joint according to claim 3, wherein the heating means for the joint is disposed within a second annular axially elongated space, which is formed between the second pipe and the second cylindrical sleeve.

6. A joint according to claim 5, comprising heat insulating material packed into said second annular space, and wherein the said heating means includes electrical resistance means distributed axially in said second annular space.

* * * * *